Figure 1:
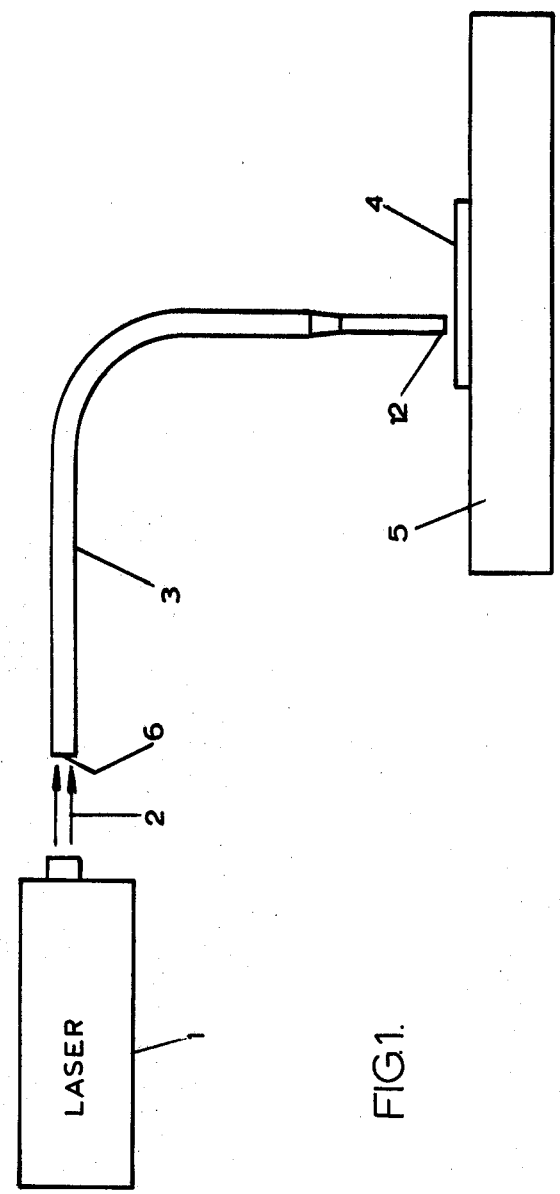

United States Patent [19]

Cullis et al.

[11] 4,305,640

[45] Dec. 15, 1981

[54] LASER BEAM ANNEALING DIFFUSER

[75] Inventors: Anthony G. Cullis, Worcester; Hugh C. Webber, Malvern; Paul Bailey, Oldham, all of England

[73] Assignee: National Research Development Corporation, London, England

[21] Appl. No.: 96,299

[22] Filed: Nov. 21, 1979

[30] Foreign Application Priority Data

Nov. 24, 1978 [GB] United Kingdom ............... 46015/78

[51] Int. Cl.$^3$ ............................................. G02B 5/14
[52] U.S. Cl. ........................... 350/96.10; 219/121 L; 350/96.28
[58] Field of Search ............... 350/96.10, 96.28, 96.29, 350/96.30; 331/94.5 R, 94.5 D, 94.5 T, 94.5 N, 94.5 C; 29/580, 582, 583; 219/121 L, 121 LP, 121 LU, 121 LV

[56] References Cited

U.S. PATENT DOCUMENTS

| | | | |
|---|---|---|---|
| 3,958,188 | 5/1976 | Fletcher et al. | 331/94.5 C |
| 4,002,896 | 1/1977 | Davies et al. | 350/96.29 X |
| 4,011,403 | 3/1977 | Epstein et al. | 350/96.10 X |
| 4,063,106 | 12/1977 | Ashkin et al. | 331/94.5 N X |
| 4,107,628 | 8/1978 | Hill et al. | 331/94.5 N |
| 4,161,944 | 7/1979 | Muckerheide | 350/96.10 X |

OTHER PUBLICATIONS

Gat et al., "A Laser-Scanning Apparatus For Annealing...", *Appl. Phys. Lett.*, vol. 32, No. 3, Feb. 1978, pp. 142–144.

Robinson, "Laser Annealing: Processing Semiconductors...", *Science*, vol. 201, No. 4353, Jul. 1978, pp. 333–335.

Gat et al., "CW Laser Anneal Of Polycrystalline Silicon:...", *Appl. Phys. Lett.*, vol. 33, No. 8, Oct. 1978, pp. 775–778.

Bertolotti et al., "Structure Transitions In Amorphous Silicon...", *J. Appl. Phys.*, vol. 50, No. 1, Jan. 1979, pp. 259–265.

*Primary Examiner*—John D. Lee
*Attorney, Agent, or Firm*—Cushman, Darby & Cushman

[57] ABSTRACT

A laser beam diffuser for use in laser beam annealing comprises a silica laser beam guiding pipe, having a diffusing surface or layer at one end and a polished surface at the other end. The diffusing surface may be a ground surface. A bend or bends removes axial component of speckle produced by the ground surface. Adjacent the polished end the pipe may be of reduced cross section.

6 Claims, 2 Drawing Figures

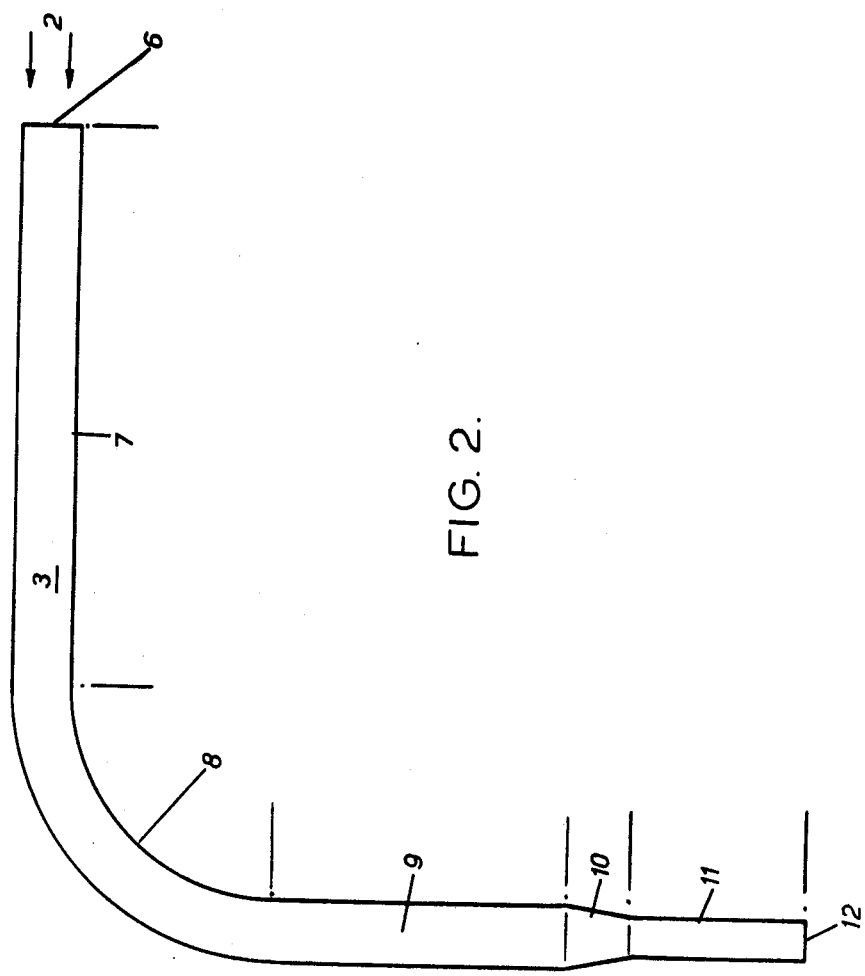

LASER BEAM ANNEALING DIFFUSER

This invention concerns the annealing of semiconductor material by beams of laser radiation, in particular it provides a diffuser for a laser beam.

Laser beam annealing is described in Science. Vol. 201, July 28, 1978, pages 333-335.

One use of laser beam annealing is the annealing of ion-implanted semiconductor layers to electrically activate the implanted dopant. Typically the dopant is implanted to a depth of 0.05-0.4 μm. Substrates may be annealed by heating in an oven but this may take an hour or so for each sample batch. In contrast laser annealing is quick and can be selective, i.e. portions of a substrate can be annealed leaving unannealed portions and the substrate is heated to a depth of typically less than 10 μm. Laser radiation in the form of short e.g. 30 ns pulses can heat the surface sufficiently quickly to melt only approximately the top μm. Unfortunately the energy applied to the substrate must be far more uniform than that present in a laser beam. It has been found that the energy intensity varies considerably across a beam of laser radiation i.e. the mode pattern. This results in parts of a substrate receiving energy greatly in excess of that required with consequential erosion of the substrate, while other parts receive only the required energy density to anneal correctly. Attempts to overcome this have used a diffusing ground glass screen between laser and substrate. Unfortunately due to the wide angle dispersion introduced by the screen the available power density distribution at the substrate is of rounded Gaussian forms with insufficient amplitude at the edges of the beam. Also the screen may induce speckle which gives rise to locally intense radiation on the substrate and consequential pitting of the surface.

According to this invention a laser beam diffuser for use in laser beam annealing comprises a laser beam guiding pipe having at one end a diffusing surface and at its other end a polished surface.

The diffusing surface may be a ground surface in which case the pipe is provided with a bend, typically a 90° bend, to remove especially the axial component of the speckle produced by the ground surface. The bend may be a simple bend in a single plane or a bend or bends in more than one plane, eg. a part of a spiral. The bend or bends should be sufficient to prevent a direct, straight line, passage of light between the two ends of the pipe. Alternatively a diffusing layer, eg. of opal, may be fixed to the end of the pipe.

Adjacent the polished end the pipe may be tapered to concentrate the laser beam power and to increase the laser beam divergence so improving the homogenization process.

The pipe may be silica of a high optical transparency at the laser wavelength or another glass with suitable transmission properties. The guide should have a smooth curved surface to internally reflect the laser light during its passage from the diffusing to the polished end.

Apparatus for laser beam annealing comprises a laser whose output is directed onto the diffusing end of the light pipe, and a table for mounting a substrate close to the polished end of the pipe. The laser may be used in either pulsed or CW modes.

The invention will now be described by way of example only with reference to the accompanying drawings in which:

FIG. 1 shows apparatus for laser beam annealing, and
FIG. 2 shows to an enlarged scale the diffuser in FIG. 1.

As shown a Q switched Nd-YAC or Ruby laser 1 is arranged to direct its output beam 2 into a silica light pipe 3. A substrate 4 to be annealed is placed close to the pipe 3 on a movable table 5. The laser used depends on the absorption of the substrate relative to the laser wavelength. A typical Nd-YAG of Ruby laser gives an output radiation energy density in the range 0.1-1 Joule/cm$^2$.

The end of the pipe 3 nearest the laser 1, the input end 6, is ground flat with diamond compound (typically 6 or 14 μm). From the diffusing end 6 the pipe of 1 cm diameter extends straight for about 10 cm and is then bent into a 90° bend 8 of about 4 cm radius. Very small ($\sim 1$ cm) radii of curvature give unacceptable loss of light through the side-wall. The purpose of the bend 8 is to give random multiple reflections from the walls to remove especially axial speckle generated by the ground end surface 6. Beyond the bend 8 the pipe extends at 9 for about 6 cm and is then tapered 10 smoothly over a length of about 1 cm to reduce the pipe diameter to about 0.65 cm. This reduced diameter 11 continues for about 6 cm and terminates in an optically polished end 12, which may have a flat or slightly curved face.

The tapered section 10 increases the power density to compensate for losses in the pipe, typically 37%. Final laser spot intensity variations can be less than ±5%.

The reduced diameter portion 11 must be short enough to avoid build up of intensity on the pipe axis but not too short, otherwise reflections from the tapered section 10 can cause focussing and final homogenisation will be incomplete. Alternatively, additional guide curvature may be introduced to suppress residual radiation inhomogeneities.

It is necessary to position the substrate 4 close e.g. $\frac{1}{2}$ mm to the pipe output end 11 to give a uniform intensity of laser beam onto the substrate. Alternatively, the output spot can be projected onto the substrate by use of a suitable lens system.

In use a substrate is doped by conventional ion implantation techniques and placed on the table 5. Such implantation produces a highly damaged or amorphous surface layer due to the atom displacements caused by the penetration of ions into the crystal lattice. The laser 1 is repetitively fired and the substrate moved between successive bursts of the laser beam. By this means selected areas of the substrate are annealed to remove damage caused by the ion implantation and restore the substrate to a crystalline state and e.g. provide electrically conducting path among an insulating non-annealed substrate.

Alternatively the laser may be fired repetitively onto one spot on the substrate to effect a segregation of dopant to the surface as the substrate cools between each firing.

Examples of materials that can be laser annealed are ion implanted silicon germanium or diamond where the ions are implanted by conventional techniques to a typical depth of about 0.2 μm. The dopant ions may be phosphorus, boron arsenic, aluminium, gallium, indium, copper, iron, nickel, gold and platinum. The laser power received on the substrate for single shot annealing is about 0.5 to 3 Joule/cm$^2$ for about 30 nano secs to anneal to a depth of about less than 1 μm. For repetitive laser firing onto a spot the laser power may be reduced below 0.5 Joule/cm$^2$. This may not melt the amorphous layer but heat it sufficiently to cause recrystallisation after repeated heating. Resolidification of a melted substrate surface takes place in about 1 us.

Other materials suitable for laser annealing include indium phosphide, gallium arsenide and indium arsenide doped with ions of sulphur, selenium tellurium, zinc, cadmium, silicon, germanium, tin or argon; the compound alloy cadmium mercury telluride doped with e.g. aluminium, mercury, or protons of hydrogen bombardment. For single shot annealing of InP typical laser power on the substrate is between 0.1 to 1 Joule/cm$^2$ and less for multi shot operation.

Some III–V compounds cannot be conventionally annealed because some constituents preferentially evaporate off on heating. However the short period of heating provided by the laser beam enables annealing to be performed with reduced loss of volatile component.

For example InP when heated in an oven preferentially evaporates phosphorus to leave an indium rich surface. Laser beam annealing for a small number of laser bursts, does not allow significant amounts of phosphorus to evaporate. Repeated applications of the laser may result in appreciable evaporation of phosphorus. In these cases the substrate may be coated with a layer of silicon nitride to prevent phosphorus evaporation.

Also some dopants e.g. nickel cannot be conventionally annealed because the dopant diffuses too widely. Laser annealing allows annealing with minimal diffusion.

Laser annealing may also be applied to the surface annealing of metals e.g. to relieve surface stress in ferrous or non ferrous metals and alloys of such metals.

The light pipe 3 may be any other suitable size, circular or other cross section, and with or without a reduced diameter end. The relevant sizes are determined by the laser beam 2 diameter and power available, and size of annealing spot required. For example two other pipes had the following dimensions:

(i) pipe diameter at 7, 0.5 cm, length 7, 7 cm, length 9, 3 cm, taper length 10, 2 cm, length 11, 3 cm, diameter at 12, 0.17 cm;

(ii) pipe diameter at 7, 0.5 cm, length 7, 5 cm, length 9, 2 cm, taper length 10, 1 cm, length 11, 4 cm, diameter at 12, 0.12 cm.

The polished end 12 may be coated with an anti-reflection coating e.g. MgF. Also the pipe 3 may be coated in part or whole to provide maximum internal reflection of the laser light.

When the diffuser end 6 of the pipe is a ground surface the speckle produced can be removed by a bend 8 which for some cases is about 90°; increasing the amount of bend does not improve the homogeneity of the laser beam and only absorbs laser power. Reducing the bend below 90° is possible but values much lower than 90° can allow speckle to pass through the pipe 3 and damage the substrate. However, adding a second curve can once again reduce speckle intensity.

To overcome speckle a layer of e.g. opal may be fixed on the end 6 to provide a speckle free diffuser. In this case the end 6 is not ground and the bend 8 may not be required.

We claim:

1. A laser beam diffuser for use in laser beam annealing comprising a rigid laser beam guiding pipe having a diffusing surface on an input end for diffusing laser radiation directed into the pipe and a polished surface on an output end, and having at least one bend intermediate the input and output ends.

2. A diffuser according to claim 1 wherein the diffusing surface is a ground surface.

3. A diffuser according to claim 1 wherein the pipe has at its polished end a portion of reduced cross section connected to the remainder of the pipe by a tapered portion.

4. A diffuser according to claims 1 or 3 wherein said a least one bend is about 90°.

5. A diffuser according to claim 1 wherein the pipe is of silica material having a high optical transparency at a laser wavelength.

6. A diffuser according to claim 1 wherein at least a portion of the pipe is coated with an anti-reflection coating.

* * * * *